Aug. 18, 1942.    W. W. OSBORNE ET AL    2,293,073
DISPENSING APPARATUS
Original Filed Feb. 9, 1929    5 Sheets—Sheet 1
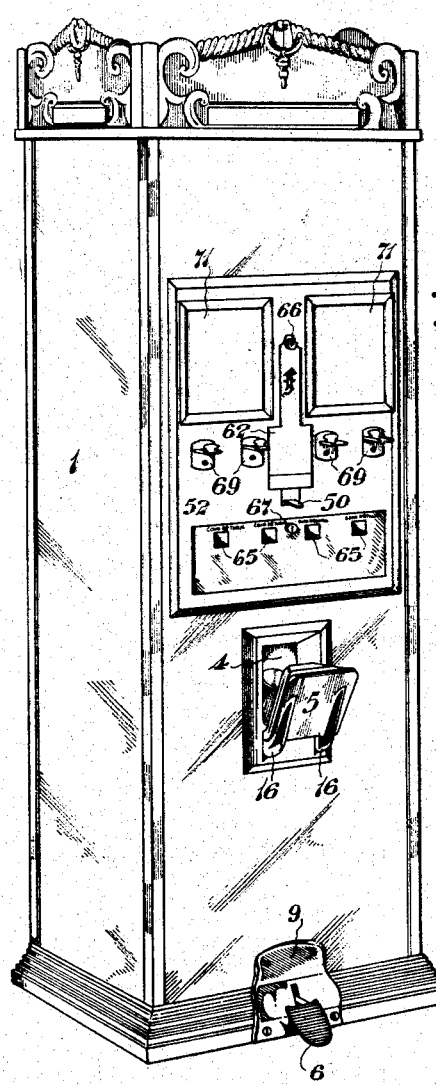
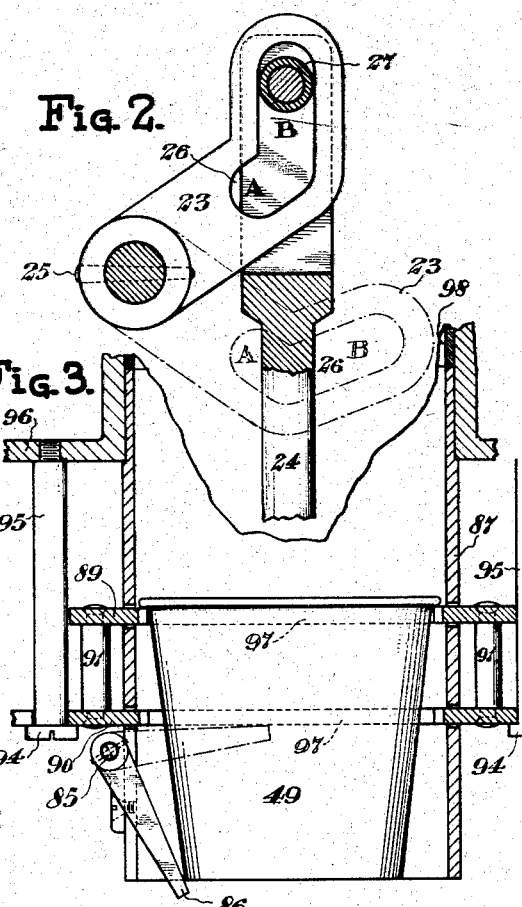
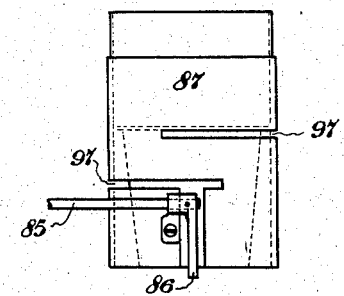
INVENTORS.
Wiley W. Osborne
Sydney W. Williamson
BY
ATTORNEY.

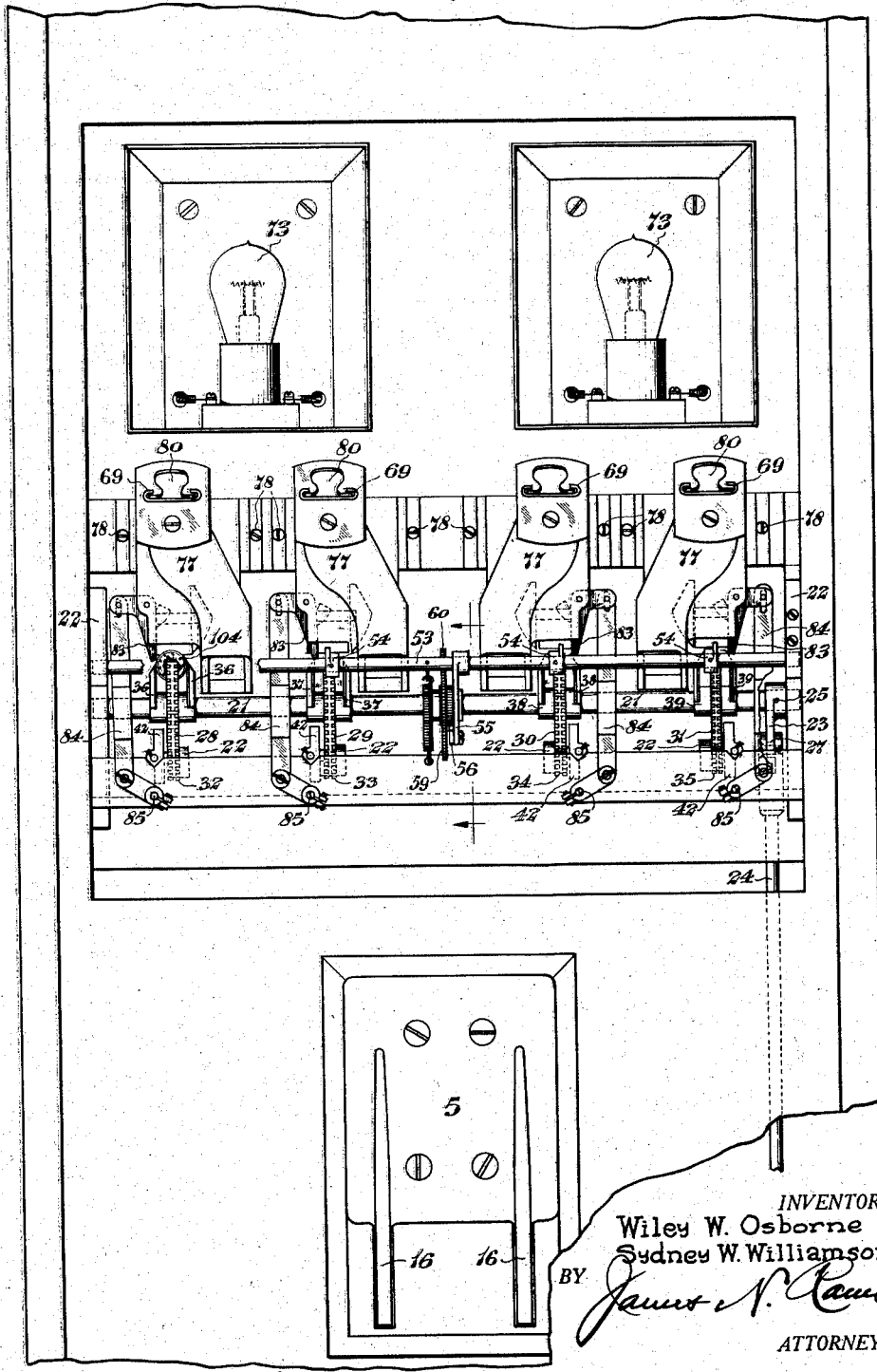

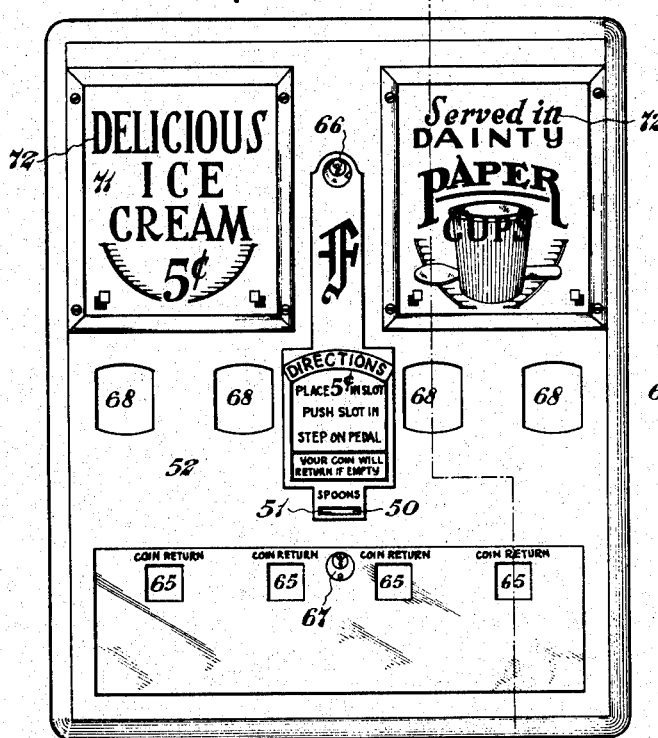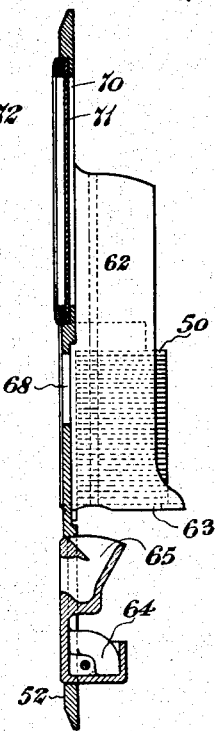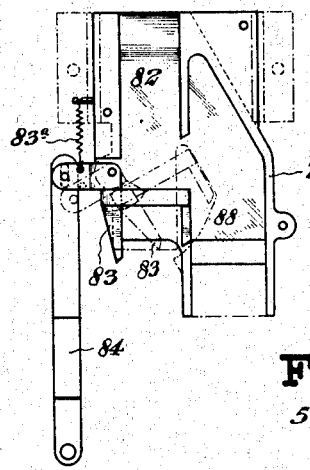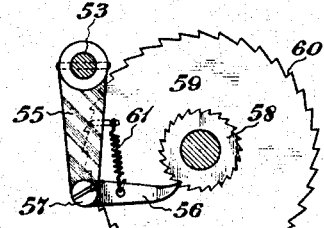

Aug. 18, 1942.   W. W. OSBORNE ET AL   2,293,073
DISPENSING APPARATUS
Original Filed Feb. 9, 1929   5 Sheets-Sheet 5

INVENTORS.
Wiley W. Osborne
Sydney W. Williamson.
BY
ATTORNEY.

Patented Aug. 18, 1942

2,293,073

UNITED STATES PATENT OFFICE 2,293,073

DISPENSING APPARATUS

Wiley W. Osborne, Cincinnati, and Sydney W. Williamson, Dayton, Ohio; said Osborne assignor, by mesne assignments, to Wellmore B. Turner, John Q. Sherman, and Edward B. Weston; Wellmore B. Turner and W. G. Clark executors of said Edward B. Weston, deceased Continuation of application Serial No. 338,866, February 9, 1929. This application April 13, 1936, Serial No. 73,981

19 Claims. (Cl. 194—85)

This invention relates to refrigerated dispensing apparatus which is automatically coin controlled for dispensing ice cream and other commodities in packages or containers, such for example, as conventional commercial type of paper cups or the like.

The object of the present invention is to provide a dispensing apparatus which is simple in construction, capable of being economically manufactured and which will be efficient in use, automatic in action, uniform in operation, of compact design and unlikely to get out of repair.

Briefly stated the invention embodies a refrigerated storage cabinet having space for a supply of packages to be released therefrom one by one under control of a foot operated pedal which opens and closes a discharge door and actuates the package release mechanism providing a coin of proper denomination has been previously inserted.

With the above primary and other incidental objects in view as will more fully appear in the specification, the invention consists of the features of construction, the parts and combinations thereof and the mode of operation or their equivalents, as hereinafter described and set forth in the claims.

The present application is a continuation of application Serial No. 338,866 filed February 9, 1929.

In the drawings wherein is shown the preferred but obviously not necessarily the only form of embodiment of the invention.

Fig. 1 is a perspective view of a dispensing cabinet embodying the present invention.

Fig. 2 is an enlarged fragmentary detail view of the connection between the pedal operated actuating rod and the main shaft.

Fig. 3 is an enlarged vertical sectional view through the lower end of one of the storage compartments illustrating the relation of the ejector means and a portion of the coin return mechanism.

Fig. 4 is a side elevation of the portion shown in Fig. 3.

Fig. 5 is a partial front elevation of the cabinet with the front panel removed.

Fig. 6 is a front elevation of the panel with the coin slides removed.

Fig. 7 is a vertical sectional view on line 7—7 of Fig. 6.

Fig. 8 is a detail view of one of the coin slide housings.

Fig. 9 is a detail view of a portion of the spoon ejecting means.

Fig. 10 is an actuating cam for the spoon ejector.

Figure 12:
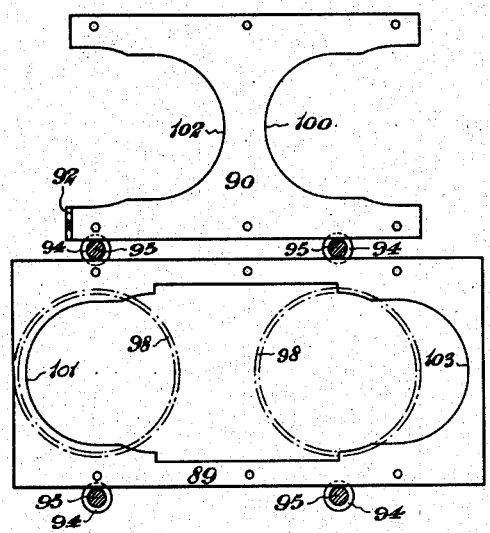
Fig. 12 is a detail view of the ejector slide.

The accompanying drawings and following description are for illustrative purposes and are not to be construed as limiting the invention to a specific embodiment.

Referring to the drawings, 1 indicates a cabinet having therein a refrigerated chamber 2 divided into a plurality of storage compartments 3 beneath which is a delivery chute 4 leading to an outlet door 5 which is controlled by a foot pedal 6.

Figure 11:
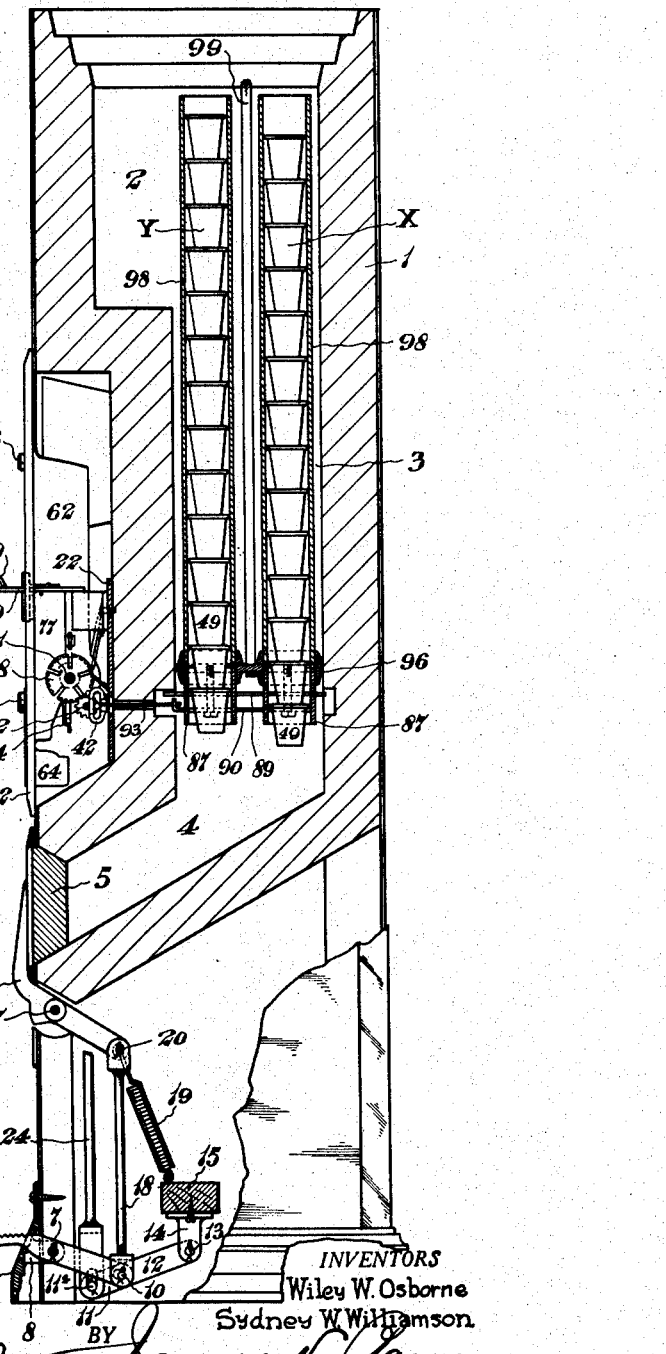
Fig. 11 is a vertical sectional view of the assembled dispensing apparatus.
Figure 18:
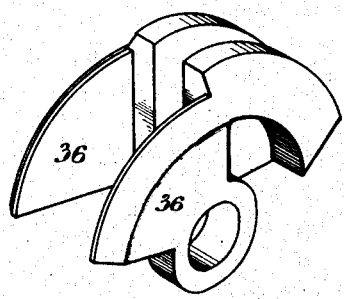
Fig. 18 is a perspective view of a coin engaging driving element.

The operating pedal 6 as illustrated in Fig. 11 is pivotally mounted upon a shaft 7 supported in bearing lugs 8 projecting from the rear face of the wall plate 9 of the cabinet. At its inner end the pedal arm is pivoted at 10 to a lever 12 fulcrumed at 13 upon dependent lugs 14 projecting from a cross bar 15 of the cabinet frame. A continuation 11 of the lever 12 beyond the pivotal connection 10 of the pedal arm is pivotally connected to the lower end of a vertical reciprocatory actuator rod 24.

The closure door 5 of the delivery chute is supported by arms 16 pivoted upon a shaft 17 supported in the cabinet frame. The door supporting arms 16 extend inwardly and are connected to the upper end of a reciprocatory actuating rod 18 the lower end of which is pivoted at 10 to the pedal arm and to the lever 12. The rod 18 is actuated upwardly to open the delivery door 5 by depression of the pedal 6 against the tension of a retracting spring 19 one end of which is attached to the cross bar 15 of the cabinet frame and the other end of which is connected at 20 to the door operating arm 16. This spring 19 normally holds the foot pedal 6 in elevated position and the delivery chute door 5 closed as is shown in Fig. 11. Upon depression of the pedal 6 the delivery door 5 will be opened and as the pressure is released the door will be automatically closed and the pedal returned by the reaction of the spring 19.

The main shaft 21 is journaled in the cabinet frame 22 and is actuated from the foot pedal 6 by means of a rock arm 23 secured to the main shaft 21 and having operative engagement with the upper end of the reciprocatory actuator rod 24, the lower end of which is connected at 11a to the extension 11 of the lever 12 which in turn is connected directly to the pedal arm at 10. The rock arm 23 is secured to the main shaft 21 by a pin 25 and is provided with an angular slot 26 in which a roller carried by the upper end of the actuator rod 24 is received. The angular slot in the rock arm 23 permits a limited movement of the actuator rod 24 independently of the rock arm during which the roller 27 travels through the portion B of the slot and thence into the portion A where it effects a movement of the arm 23 from the position shown in full lines in Fig. 2 to that shown by dotted lines and vice versa.

Figure 14:
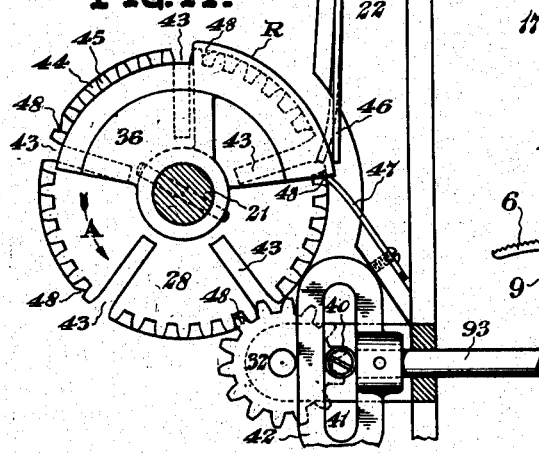
Fig. 14 is an enlarged side elevation of the coin coupling and actuating means for the ejector.

As shown in Fig. 5 there are mounted upon the main shaft 21 a series of gears 28—29—30 and 31 all of which are freely rotatable upon the shaft and in permanent meshing engagement with corresponding gear pinions 32, 33, 34 and 35, respectively. Secured to the main shaft 21 preferably by being pinned thereto on opposite sides of the gears 28, 29, 30 and 31 are pairs of coin engaging actuators or drivers 36—36, 37—37, 38—38, and 39—39. The pinions 32, 33, 34 and 35 are rotatably supported in the frame 22 and each pinion carries a roller 40 engaging in the slot 41 of a cross head 42 as is illustrated in enlarged detail in Fig. 14. The several sets of gears, pinions, cross heads, and associated actuator segments or drivers are of like construction. As is illustrated in Fig. 14 the gear 28, as are all corresponding gears, is provided with five equally spaced radial slots 43 to receive a deposited coin. A rib associated with the gear teeth 45 of the gear 28 prevents a coin from dropping between the teeth and thereby locking the machine against use.

When in normal position one of the coin slots 43 in the gear 28 will be aligned with the passage 82 of the coin slide housing (Fig. 8) to receive a coin therefrom. To insure exact alignment of the coin slot with the passageway 82 there are provided a pair of locating springs 46 and 47 both mounted upon the frame 22. The spring 46 rides upon the rib 44 of the gear which rotates in the direction of the arrow in Fig. 14, until it engages in one of the coin slots 43. When the gear 28 has completed its movement the spring 47 engages one of the notches 48 at the extremities of the ribs 44 to hold the gear against reverse movement during the return of associated parts to normal position. The spring 47 also engages the teeth of the gear in such manner as to reduce momentum during its forward movement and thereby prevent overthrow of the gear. The spring 46 is somewhat wider than the spring 47 and when the parts are in their normal position as is shown in Fig. 14 the arresting spring 46 is held away from the gear 28 by the actuator segments or coin drivers 36—36. When a coin is deposited from the coin slide 69 into the gear slot 43 and the pedal 60 pressed the main shaft 21 is rocked through a partial rotation carrying with it the coin engaging or driving segments 36 which are secured upon the shaft 21 and which by their engagement with the coin deposited in the coin slot 43 cause the gear 28 to be advanced through a like partial rotation. During this advance movement the stop spring 46 rides upon the rib 44 until the next succeeding coin slot 43 is aligned in receiving position at which time the spring 46 engages a coin slot 43 to prevent overthrow of the gear 28. The stop springs 46 and 47 retain their engagement with the gear until the coin drivers 36 return to normal position by the reverse oscillation of the main shaft 21 as the pedal and connecting parts are returned to normal under the reaction of the spring 19. At the limit of the return movement the rear edge of the coin drivers 36 engage and force the spring 46 out of engagement with the gear and permit the gear to have free forward movement on the next operation of the machine.

During the period they are advanced from normal position the peripheries of the segmental coin drivers 36 prevent a second coin from being deposited either in the next succeeding coin slot 43 in the gear 28 or into locking relation with any of the teeth intermediate such slots and further prevent the locking of such coin driver segment in a forward or operated position.

With each cup 49 delivered in to the chute 4 a spoon 50 is issued through the slot 51 in the front panel 52. The spoon ejector mechanism includes a shaft 53 journaled in the frame 22 and carrying cams 54 (shown in Figs. 5 and 10) in aligned relation with the respective gears 28, 29, 30 and 31 for operative engagement of one or another of the cams 54 by a deposited coin in the coin slot 43 of the corresponding gear. Pinned or otherwise fixedly secured to the shaft 53 is an arm 55 carrying a pawl 56 pivoted thereto at 57. The pawl 56 engages a ratchet wheel 58 secured to a toothed disc 59 having peripheral teeth 60. A spring 61 tends to hold the pawl 56 against the ratchet wheel 58. The tooth disc 59 is located beneath a spoon receptacle 62 with the pripheral teeth 60 protruding through a slot 63 in the bottom of the receptacle. As the disc 59 is given a partial rotation through the action of the pawl 56 operating the ratchet wheel 58, the teeth 60 engaging the bottommost spoon of the supply in the receptacle 62 push the spoon outwardly through the slot 51 sufficiently that the customer may easily grasp the spoon and remove it by a pulling motion. The operation of this spoon ejecting mechanism depends upon the deposit of a coin in one of the coin slots 43 of one or another of the several gears. The spoon receptacle 62 and the spent coin tray 64 and coin return tray 65 are carried by the front panel 52 and are controlled by the locks 66 and 67. The front panel 52 is provided with openings 68 to receive the coin slides 69 as shown in Fig. 1. If desired the cabinet may be provided with an advertising transparency 71 bearing indicia and advertising matters 72 and illuminated by electric lamps 73.

Figure 16:
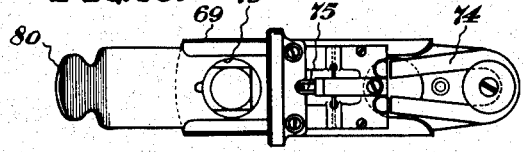
Figs. 16 and 17 are respectively a top plan and bottom plan view of the coin slide.
Figure 17:
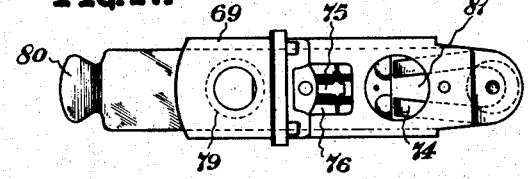

The coin slides 69 illustrated in Figs. 16 and 17 are provided with magnets 74 which attract any ferrous metal slugs which may be deposited in the machine and prevent them from dropping into the coin slot 43 of the gear 28. There are also associated with the coin slides fingers 75 positioned to engage in the hole of a washer if deposited in the machine and prevent the washer from dropping into the coin slot in lieu of a proper coin. If a coin smaller than a five cent coin; that is, a dime or a cent is inserted within the coin slide 69 it will fall through a hole 76 provided for such purpose and be delivered to the coin return tray 65. Associated with each coin slide 69 is a chute 77 (see Fig. 5) secured to the frame 22 by screws 78 and delivering a deposited coin into the passageway 82 aligned with the coin slot 43 in the gear 28. Thus a coin 104 released from the coin slide 69 by reciprocation of the handle 80 will pass through the chute 77 into the passageway 82 and thence into the coin slot 43 normally aligned with the passageway 82 as is shown in Fig. 5.

Figure 13:
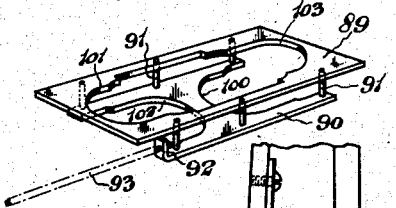
Fig. 13 is a perspective view of the ejector slide in assembled condition.
Figure 15:
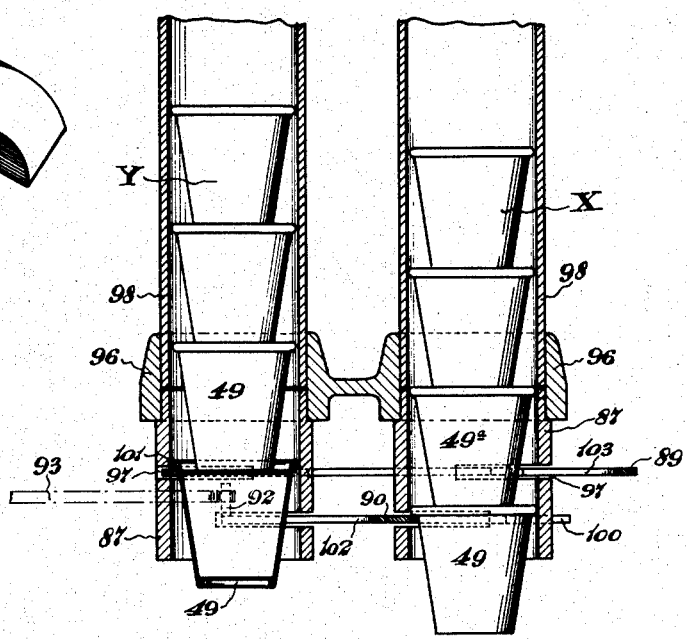
Fig. 15 is an enlarged vertical sectional view illustrating the relation of companion storage compartment and the ejector means pertaining thereto.

Associated with the coin chute 82 is a pivotally mounted deflector member 83 normally held out of the path of movement of a deposited coin by the retractile spring 83a as shown in Fig. 8. This coin deflector 83 is operatively connected through the link 84 and shaft 85 with an arm 86 associated with the article magazine 87. The arm 86 is normally held in a retracted position by an article to be dispensed in the magazine. If the supply of articles 49 within the magazine is exhausted the arm 86 automatically moves inwardly to the dotted line position shown in Fig. 3 under influence of the weight of the link 84, the movement of which simultaneously effects an oscillation of the coin deflector 83 from its normal position to the dotted line position shown in Fig. 8 whereby a coin descending through the passage 82 is deflected into the companion passageway 88 ad thence into the coin return tray 65. As the coins 104 which have passed through the coin passage 82 into the aligned coin slot 43 of the corresponding gear are carried forward by successive partial rotation of the gear as hereinbefore described, such coins are dropped from the coin slots 43 into the spent coin tray 64. The ejector means for the cups or other articles comprises a reciprocatory slide mounted for transverse movement within the lower extremities 87 of the article magazine as is shown in Fig. 15. The ejector slides comprise upper and lower plates 89 and 90 interconnected by spacers 91 as shown in Fig. 13. The lower plate 90 of the ejector slide is provided with an ear 92 to which is connected one end of an actuator rod 93 the opposite end of which is fixedly attached to the cross head 42 as shown in Figs. 11 and 14. The lower plate 90 of the ejector slide is supported by the heads of studs 95 secured to the frame casting 96 (Fig. 3). The magazine tubes 87 are provided with horizontal slots 97 to receive the plates 89 and 90 as is shown in Figs. 3, 4, and 15. The upper end of the magazine fitting or tube 87 is received by the casting 96 and is of the same internal diameter as the magazine tubes 98, the lower ends of which engage in the mounting casting 96 as is shown in Fig. 15. This mounting casting 96 is supported in the storage compartment 3 by a strip 99.

As is illustrated in Fig. 15 the lower plate 90 of the ejector slide supports the lowermost article or cup 49 of the stack X by engagement of the marginal flange of the article or cup in overlapping relation with the margin of the opening 100. At the same time the upper plate supports the lowermost article or cup 49 of the stack Y by engagement of the peripheral flange of the article or cup in overlapping relation with the margins of the opening 101.

As the rod 93 is reciprocated by the action of the gear 28 and pinion 32 which cooperates with the cross-head 42, the cup 49 of the stack X will be released from the opening 100 of the plate 90 and will be dropped into the chute 4 for delivery from the cabinet. At the same time the lowermost cup or article 49 of the stack Y will be disengaged from the opening 101 of the plate 89 and will be caught by the lower plate 90 and suspended in the opening 102 thereof. At the same time the cup 49a of the stack X will be caught with its peripheral margins overlapping the margin of the opening 103 of the plate 89 and will be suspended therein preparatory to the next operation. It will therefore be apparent that when the ejector slide comprising the spaced interconnected plates 89 and 90 is moved in one direction the cup will be released from the stack X and when moved in reverse direction a cup or article will be released from the stack Y. Each coin slide 69 is therefore common to two of the magazine tubes 87—98. The cabinet illustrated in the drawings is provided with four coin slides and hence will be provided with eight article magazines suitable for dispensing four different commodities or ice cream of four different flavors. However, more or less units may be utilized without affecting the principle of the invention. As all of the units are of similar construction or duplicates of each other the foregoing description of the operation of one unit consisting of two magazines 87—98 and one coin operated gear 28 and its associated pinion 32 and actuated ejector slide comprising the upper and lower plates 89 and 90 will suffice for all.

To operate the machine the handle 80 of the coin slide 69 is drawn forward and the proper coin is placed within the opening 79 of the coin slide and the handle pushed in causing the coin to drop through the chute 77 into the passageway 82 and be deposited in a vertical position within the coin slot 43 of the gear 28 as is shown in Fig. 5. The operator then depresses the foot pedal 6 which raises the actuator rod 24 upwardly oscillating the rock arm 23 and transmitting a partial rotation to the main shaft 21. The coin segments or drivers 36 being pinned to the main shaft 21 are oscillated forwardly against the deposited coin 104 in the gear slot 43 and the gear 28 will be actuated forwardly through a partial rotation. Such movement of the gear 28 imparts rotary motion to the pinion 32 through substantially a one-half rotation. Such motion of the pinion 32 is transmitted through the crosshead 42 to the reciprocatory rod 93. The reciprocatory motion transmitted through the rod 93 to the ejector slide 89—90 releases a package or cup from one of the associated magazines for delivery by gravity through the chute 4, the closure door of which has been opened by the action of the pedal. At the same time a cup or article is transferred from the upper plate 89 to the lower plate 90 below the companion magazine preparatory to the next dispensing operation.

The coin 104 deposited in the coin slot 43 extends slightly above the gear 28 and as the gear is advanced by the driver segments 36 the coin engages the cam 54 to rock the shaft 53 and thereby actuate the arm 55 and pawl 56 to advance the ratchet wheel 58 and with it the spoon ejector disc 59. The lowermost spoon 50 of the supply resting directly upon the teeth 60 of the ejector disc 59 will be projected outwardly through the slot 51 in the front panel 52. After the driver segments 36 have advanced through their full stroke movement and the foot pedal 6 is released, the spring 19 will retract the foot pedal and automatically close the door 5, the main shaft 21 and driver segment 36 simultaneously returning to their normal position as is shown in Fig. 14. The gear 28 however remains in its advanced position due to the detent spring 47 with the next succeeding coin slot 43 aligned with the coin passage 82. However if the magazines are empty the coin deflector 83 will be automatically positioned relative to the coin passage 82 to deflect a deposited coin into the passage 88 and thence to the coin return tray 65.

This machine is self contained and automatic and to a very great extent resists tampering and improper operation or is "fool proof." The invention is capable of various changes, modifications and rearrangement of parts without departing from the scope or spirit thereof. For example, a single article magazine may be employed in lieu of pairs of magazines by a change of gear ratio between the gears 28 and pinion 32. However magazines in pairs operated alternately and controlled by a common coin device is preferred. Such machine is capable of serving more customers with less attention than would be the case with a single magazine construction.

The storage chamber 2 may be cooled by dry ice, wet ice, electric refrigeration, or any other suitable refrigerating means. When servicing the machine, the spoon receptacle is filled with spoons and the several magazine tubes are replenished with the articles to be dispensed, in the present instance, cups containing ice cream. At the same time the lock 67 to the coin trays may be opened giving access to the previously deposited money in the spent coin trays.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. In a package vending machine, the combination with a cabinet for containing packages to be dispensed therefrom and having a package discharge outlet, package dispensing means including a reciprocatory slide intersecting the cabinet and having vertically spaced fixedly interconnected plates, each having an open area through which a package will pass and each having stop means for arresting the passage of a package, said stop means being disposed in laterally offset relation with the open areas, the open areas and stop means of the respective plates being reversely disposed substantially in registry with each other whereby a package passing through the open area of one plate is arrested by the stop means of the other plate and a package arrested by either plate is released therefrom through the open area of the same plate by relative shifting movement of the slide, actuating mechanism operative at the will of the operator for reciprocating the slide, and motive means for the slide actuating mechanism to effect discharge of a package through the package outlet by reciprocation of the slide.

2. In a dispensing apparatus of the type wherein articles to be dispensed are released one at a time alternately from separate supplies thereof, including a delivery device operable into alternate positions relative to the article supplies, and actuating means therefor including a gear wheel adapted to be progressively advanced through a step by step movement, a pinion intermeshing therewith and actuated through a one-half rotation at each advancement of the gear wheel, a crank rotating in unison with the gear pinion to which the delivery device is coupled for alternating movement at each operation of the gear and pinion, a rock shaft on which said gear is loosely journaled, actuating means for operating the rock shaft in alternate directions, and means enabling operative intercoupling of the rock shaft with the gear for unison movement in one direction at the will of the operator, for advancing the gear wheel through a step by step movement, the return movement of the rock shaft being independently of the gear.

3. In an article vending machine of the type wherein articles are to be vended one by one alternately from separate supplies thereof, a reciprocatory article release slide including two vertically spaced fixedly interconnected decks each having an open area through which an article to be vended will freely pass, and stop means for arresting the passage of an article therethrough, the open areas and stop means of the respective decks being reversely disposed substantially in registry with each other, construction and arrangement being such that a package passing through the open area of the top deck will be arrested by the means pertaining to the open area of the lower deck and a package arrested by the stop means of either deck is released therefrom through the open area of the same deck by the shifting movement of the reciprocatory slide, motive means for alternating the slide, and means for operatively connecting the motive means with the slide.

4. In a dispensing apparatus, a container for a supply of articles to be dispensed, dispensing means for releasing the articles singly, operating means including a rock shaft, relatively spaced rock arms carried thereby, an actuator member for the dispensing means loosely mounted on the rock shaft intermediate the rock arms and slotted to receive a coin engageable by the rock arms whereby said actuator is temporarily coupled to the rock arms for unison motion, and means for actuating the rock shaft.

5. In an article vending machine of the class described, a cabinet for containing separate supplies of articles to be vended, coin controlled ejector means common to the separate supplies of articles for releasing the articles one at a time alternately from the respective supplies thereof, coin controlled means governing the operation of the ejector means, package delivery means, actuating means common to the delivery means and ejector means operative to actuate the delivery means independently of the deposit of a coin and upon deposit of a coin operative to actuate both said means in timed relation.

6. In a package dispensing apparatus, two package storage compartments each containing a column of packages to be delivered, means for delivering a single package alternately from first one compartment and then the other, comprising a reciprocable member common to both compartments and including superposed plates arranged to cooperate with the side walls of the containers and provide openings by movement of the plates in one direction or the other through which packages may pass to the point of delivery and by its continued movement in one direction or the other to engage and maintain packages in the respective compartments at different levels whereby as a package is delivered from one compartment the lowermost package in the other compartment will be held against delivery until released by the next succeeding movement of the member, and means for reciprocating the member.

7. In a package dispensing apparatus, two package storage compartments each containing a column of packages to be delivered, means for delivering a single package alternately from first one compartment and then the other, comprising a reciprocable member common to both compartments and operable to detain a package in release position from one compartment while releasing a package from the other compartment when in one position of adjustment and when in its opposite position of adjustment to release said first mentioned detained package and detain in release position a succeeding package from the compartment from which a package was previously released and means for reciprocating said member into alternate operative positions, including a normally independently operable rock shaft, an actuator for the reciprocable dispensing member actuated thereby, means for actuating the rock shaft, and means enabling the coupling of the rock shaft and the actuator for the reciprocable dispensing member at the will of the operator.

8. In a package dispensing apparatus of a type wherein packages are delivered alternately from two package storage compartments each containing a column of packages to be delivered through a common discharge outlet, means for delivering a single package alternately from first one compartment and then the other, comprising a reciprocable member common to both compartments and including superposed plates arranged to cooperate with the side walls of the containers and provide openings by movement of the plates in one direction or the other through which packages may pass to the point of delivery and by its continued movement in one direction or the other to engage and maintain packages in the responsive compartments at different levels whereby as a package is delivered from one compartment the lowermost package in the other compartment will be held against delivery until released by the next succeeding movement of the member, actuating means under control of an operator for operating the package release means, said actuating means being normally ineffective to actuate the release means and optional means for operatively intercoupling the actuating means and package release means at the will of the operator.

9. In a package dispensing apparatus of a type wherein packages are delivered alternately from two package storage compartments each containing a column of packages to be delivered through a discharge chute having a closure door, means for delivering a single package alternately from first one compartment and then the other, comprising a reciprocable member common to both compartments and including superposed plates arranged to cooperate with the side walls of the containers and provide openings by movement of the plates in one direction or the other through which packages may pass to the point of delivery and by its continued movement in one direction or the other to engage and maintain packages in the respective compartments at different levels whereby as a package is delivered from one compartment the lowermost package in the other compartment will be held against delivery until released by the next succeeding movement of the member, a normally idly operating actuating means for the package release means under control of an operator, and coupling means intermittently operatively connecting the package release means and the actuating means for temporary unison operation.

10. In a package dispensing apparatus, a compartment containing a column of packages to be delivered one by one through the bottom thereof, a reciprocatory member intersecting the package compartment, including a pair of fixedly interconnected vertically spaced plates each having therein an opening of a configuration to provide an area for passage of a package through the plate and a restricted package arresting area the areas of each plate opening being positioned to be alternately registered with the package compartment by reciprocation of the reciprocatory member and the package passing area of each plate opening being disposed in registry with the restricted area of the other plate opening whereby a package passing through the package passing area of the uppermost plate is arrested by the package arresting area of the lowermost plate opening to be subsequently delivered by movement of the reciprocatory member, and means for reciprocating the member.

11. In a package dispensing apparatus, a vertical magazine tube from the bottom of which packages are to be dispensed one by one, a reciprocatory slide intersecting the magazine and including two fixedly interconnected vertically spaced plates each having therein an open area for passage of a package and a package arresting area, said areas to be alternately registered with the magazine by the reciprocation of the slide, the open areas and arresting areas of the respective plates being disposed in registry with each other whereby a package passing through the open area of one plate is arrested by the arresting area of the other plate and a package arrested by one plate is released therefrom through the open area of the same plate by the relative shifting movement of the slide.

12. In a package dispensing apparatus, a magazine for a supply of packages to be dispensed one by one from the bottom thereof, a reciprocatory slide intersecting the magazine including two vertically spaced fixedly interconnected decks each having an open area through which a package will pass and stop means for arresting the passage of a package disposed in laterally offset relation with the open area, the open area and stop means of the respective decks being reversely disposed substantially in registry whereby a package passing through the open area of one deck will be arrested by the stop means of the other deck, and a package arrested by the stop means of either deck is released therefrom by relative shifting movement into the open area of such deck.

13. In a dispensing apparatus, a container for a supply of articles to be dispensed, dispensing means for releasing the articles singly, operating means including a rock shaft, relatively spaced arms carried thereby to receive a coin, a member carried by the shaft intermediate the rock arms and having temporary engagement with the coin for effecting unison motion of the rock arms and intermediate member, an operative connection for transmitting such unison motion to the article dispensing means, and means for actuating the rock shaft.

14. In a vending apparatus, a cabinet for containing a supply of articles to be vended, a reciprocatory dispensing device movable to alternate positions to release the articles one at a time, an intermittently operated rotary actuator for the dispensing device, means for operating the actuator through successive partial rotations, said dispensing device being shifted to alternate positions by each partial rotation to release an article from the cabinet during each succeeding partial rotation of said actuator and coin controlled means governing the operation of the actuator.

15. In a dispensing apparatus wherein a plurality of packages are dispensed one by one from a storage magazine by a coin controlled dispensing mechanism including a reciprocatory slide, a normally idly operating actuating mechanism for the slide including a rock shaft, an operator for the slide loosely mounted on the rock shaft and adapted by its successive actuations to operate the slide first in one direction and then in the other, and means for coupling the slide operator with the rock shaft upon deposit of a coin for unison motion through one directional impulse only of the reciprocatory slide by which a single package will be released from the magazine.

16. In a dispensing apparatus wherein a plurality of packages are dispensed one by one from a storage magazine by a coin controlled dispensing mechanism including a reciprocatory slide, a normally idly operating actuating mechanism for the slide including a rock shaft, an operator for the slide loosely mounted on the shaft for step by step advancement, and operatively connected with slide to transmit thereto one movement at a time through a cycle of movement in one direction and then in the other, and intercoupling means for operatively connecting the actuating mechanism and slide by a deposited coin for unison motion through one directional impulse only of the reciprocatory slide by which a single package will be released from the magazine.

17. A dispensing apparatus wherein a plurality of packages are dispensed one by one from a storage magazine and discharged through an outlet from the apparatus by coin controlled dispensing mechanism including a reciprocatory slide, a normally idly operating foot actuated mechanism, a door for the discharge outlet actuated thereby, and an operating rock shaft for the slide operatively connected with the foot operated actuating mechanism for unison operation, step by step actuating means for the slide operative to reciprocate the slide to release a single package from the magazine on each step by step movement thereof, and intercoupling means for operatively connecting the step by step slide actuating means with the rock shaft by a deposited coin for unison motion through one package release motion only of the slide by which a package will be released from the magazine and the outlet door opened in timed sequence for escape of the released package.

18. In a package dispensing apparatus, a cabinet, a magazine therein for packages to be dispensed, a delivery passage for dispensed packages, a reciprocatory slide controlling the escape of packages from the magazine to the delivery passage including vertically spaced relatively fixed decks, each having therein relatively spaced restricted open areas within which a package may be suspended but through which the package will not pass, and from which the suspended package is laterally disengageable, the restricted open areas of the respective decks being offset whereby a suspended package disengaged from the restricted open area of the upper deck will be reengaged and suspended in the restricted open area of the lower deck for subsequent lateral discharge therefrom, means for reciprocating the slide to present the restricted open areas of the upper deck alternately in and out of registry with the magazine to receive succeeding packages therefrom, and to simultaneously shift the restricted areas of the lower deck alternately into and out of registry with the package delivery passage, means for restraining the packages during such shifting movement whereby the restricted opening of the decks will be moved out of relation therewith, and actuating means for reciprocating the slide.

19. In a package dispensing apparatus, a cabinet, a magazine therein for packages to be dispensed, and a delivery passage for dispensed packages, a reciprocatory slide interposed between the magazine and delivery passage including vertically spaced relatively fixed decks, each having restricted openings therein in which packages to be dispensed may be suspended and from which the suspended packages are laterally disengageable, the restricted openings of the respective decks being laterally offset whereby a package laterally disengaged from the restricted opening of the upper deck will be engaged and suspended in the restricted opening of the lower deck, and means for reciprocating the slide relative to the packages suspended thereon to release the suspended packages and simultaneously present the restricted area of the upper deck in registry with the magazine to receive a package therefrom and shift the restricted area of the lower deck out of registry with the discharge passage to disengage a suspended package therefrom, and means for reciprocating the slide.

WILEY W. OSBORNE.
SYDNEY W. WILLIAMSON.